United States Patent [19]
Henderson et al.

[11] Patent Number: 5,911,235
[45] Date of Patent: Jun. 15, 1999

[54] WALKER GLIDE

[76] Inventors: Richard E. Henderson; Kathleen O'Brien, both of 107 Whispering Sands Cir., Sarasota, Fla. 34242

[21] Appl. No.: 08/851,748

[22] Filed: May 5, 1997

[51] Int. Cl.[6] ................................. A45B 1/02; A61H 3/04
[52] U.S. Cl. ............................................................ 135/85
[58] Field of Search ................................. 16/18 A, 18 R, 16/DIG. 40, 31 R; 135/67, 74, 82, 85; 280/87.051, 87.021, 87.041; 301/1, 5.1, 111

[56] References Cited

U.S. PATENT DOCUMENTS

| | | | |
|---|---|---|---|
| 941,664 | 11/1909 | Thompson | 16/18 A |
| 985,492 | 2/1911 | Arbeiter | 16/18 A |
| 1,421,647 | 7/1922 | Wolfs | 16/18 A |
| 3,165,314 | 1/1965 | Clearman et al. | 135/67 |
| 3,675,269 | 7/1972 | Closa | 16/18 A |
| 3,928,888 | 12/1975 | Lapham | 16/18 A |
| 4,509,227 | 4/1985 | Keane | 16/DIG. 40 |
| 5,075,924 | 12/1991 | Estkowski et al. | 16/18 A |
| 5,222,786 | 6/1993 | Sovis et al. | 301/111 |
| 5,573,213 | 11/1996 | Henderson et al. | 16/42 R |

FOREIGN PATENT DOCUMENTS

| | | | |
|---|---|---|---|
| 2315619 | 10/1974 | Germany | 16/35 R |

OTHER PUBLICATIONS

"Mushroom Glide" brochure of D.M.D. Co./Cares R US Ltd.

*Primary Examiner*—Chuck Y. Mah
*Assistant Examiner*—Donald M. Gurley
*Attorney, Agent, or Firm*—Charles J. Prescott

[57] ABSTRACT

A glide, preferably self retaining, for the lower end of each rear leg of a walker. The device substantially reduces forward drag or resistance to walker sliding movement over a support substrate such as carpet, hard floors, concrete, ground and like, while simultaneously increasing resistance to side ways or lateral slippage. The device includes a stationary or fixed member which engages with and receives support from each walker leg lower end and includes a support shaft orientated at an acute angle of preferably about fifteen degrees (15°) to the central axis of the leg. A ground engaging member is held on the support shaft for rotation only and has a lower exterior contoured ground engaging surface which, in combination with the acute angle, makes contact with the support substrate laterally from the central axis of the leg.

10 Claims, 3 Drawing Sheets

WALKER GLIDE

BACKGROUND OF THE INVENTION

1. Scope of Invention

This invention relates generally to walkers used by handicapped individuals and those weakened or recovering from injury and particularly to a glide connectable onto the lower leg of a walker for improved performance and stability.

2. Prior Art

Walkers are well known products available for the permanently handicapped and those individuals weakened or recovering from injury particularly to lower limbs. Used in lieu of crutches, canes or other ambulatory aids, a walker provides considerably more stability for the individual by providing four spaced apart legs in a rectangular pattern for inherent upright stability and tip resistance.

In using a walker, the individual grasps upper horizontal side handles or support members of the walker to receive leaning support during each stride or step taken. In between each stride, the individual then lifts the walker from the floor, ground or support surface or simply removes body weight sufficiently to slide or move the walker forward or rearward in preparation for the next stride taken.

Conventional walkers are manufactured with rubber or plastic caps fitted onto the lower ends of each leg. The legs themselves are typically manufactured from aluminum tube for strength and lightness. These caps provide wear resistance while minimizing scratching and wearing of the support surface and further, when made of an anti-skid material such as rubber, increase the stability provided by the walker during each stride and while being supporting a stationary user.

Ideally, the ease with which an individual utilizes the walker is enhanced where resistance to forward movement or drag in between each stride is minimized. To accomplish this, prior art discloses an alternative to the caps in the form of wheels positioned onto the lower ends of either or both forward and rear legs of walkers. Typically, when forward wheels are utilized, they are mounted on rigid axles for rolling movement only. Alternately, when positioned at the lower ends of the rear legs, the wheels may either be fixed for rotation only or also allowed to turn about an upright axis for turning maneuvers.

Generally, lateral movement of the walker during use is undesirable as it typically represents movement which decreases the overall stability of the individual using the walker. Thus, caps provided at the lower ends of the legs, while perhaps providing some increase in lateral drag, provide that same increase in forward drag, an undesirable result. Likewise, rear wheels in lieu of caps which turn or pivot about an upright axis, while increasing maneuverability, also decrease lateral stability.

A prior invention disclosed in our previous U.S. Pat. No. 5,573,213 provides a stationary glide fitable onto the lower ends of preferably the rear legs of a walker which substantially reduces forward drag or resistance to forward movement while substantially increasing the lateral stability or side-to-side resistance to movement. However, substantial frictional engagement with the support substrate atop which the walker is used has resulted in accelerated wear of the beneficial elongated downwardly disposed fins of this device.

The D.M.D. Co./Cares R U.S. Limited of Wheeling, Ill. is now distributing a product called a MUSHROOM GLIDE which is advertised to improve safety and maneuverability of an existing walker. This device appears to be intended to fit into the lower ends of the rear legs of the walker and presents an arcuate lower ground-engaging surface which is generally uprightly oriented to the ground-engaging surface and does not include any moving parts, rather depending entirely upon friction engagement with the ground-engaging surface. Uneven and only partial wear of this device will likely result in a very short wear life.

BRIEF SUMMARY OF THE INVENTION

This invention is directed to a glide, preferably self retaining, for the lower end of each rear leg of a walker. The device substantially reduces forward drag or resistance to walker sliding movement over a support substrate such as carpet, hard floors, concrete, ground and like while simultaneously increasing resistance to side ways or lateral slippage. The device includes a stationary or fixed member which engages with and receives support from each walker leg lower end and includes a support shaft orientated at an acute angle of preferably about fifteen degrees (15°) to the central axis of the leg. A ground engaging member is held on the support shaft for rotation only and has a lower exterior contoured ground engaging surface which, in combination with the acute angle, makes contact with the support substrate laterally from the central axis of the lower leg and fully wears through 360° of its rotation.

It is therefore an object of this invention to provide a glide for the lower ends of the legs of a walker which will substantially reduce the forward drag against the support substrate during use.

It is another object of this invention to provide a glide for the lower end of the rear legs of a walker which substantially decreases the tendency for lateral or sideways movement of the walker.

It is another object of this invention to provide a glide for the lower end of legs of a walker which is self-retaining after installation without the need for other fasteners or adhesives for securement.

It is yet another object of this invention to provide a glide for the lower end of legs of a walker in various sizes to accommodate virtually any walker leg diameter.

It is still another object of this invention to provide a glide for the lower ends of the legs of a walker which incorporates a rotatable ground-engaging member which contacts the support substrate at a contact point or area offset from the longitudinal axis of the leg for reduced forward resistance movement, increased lateral stability of the walker and a full 360° of wear life.

It is yet another object of this invention to provide a walker glide which not only has better wear characteristics but facilitates easier turning of the walker, even when heavily worn, very silent rolling motion over the support substrate in a width sufficient for reducing the tendency of catching on holes, slots and in elevators.

In accordance with these and other objects which will become apparent hereinafter, the instant invention will now be described with reference to the accompanying drawings.

DETAILED DESCRIPTION OF THE INVENTION

Figure 1:
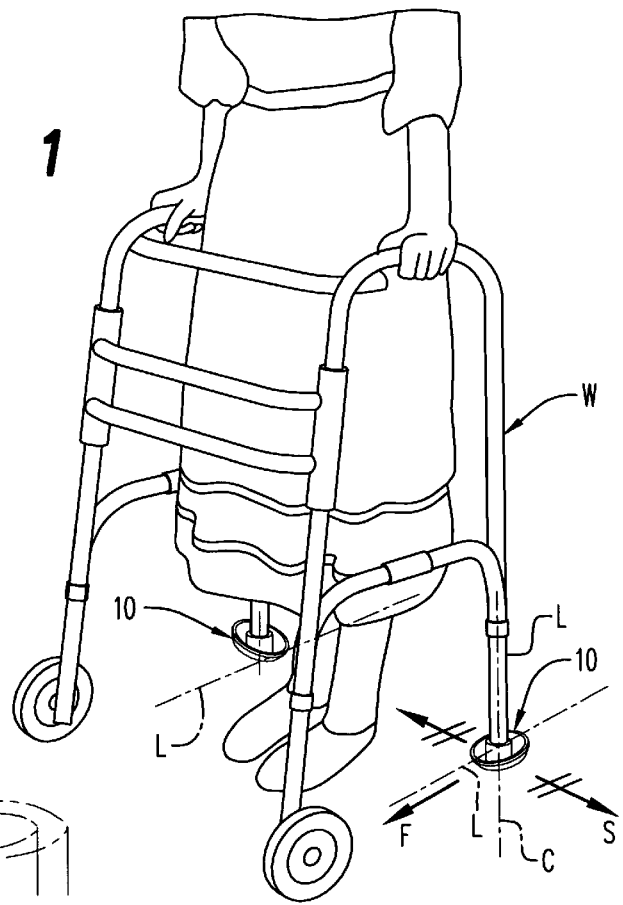
FIG. 1 is a perspective view of the invention positioned for use onto the lower ends of the rear legs of a walker.
Figure 2:
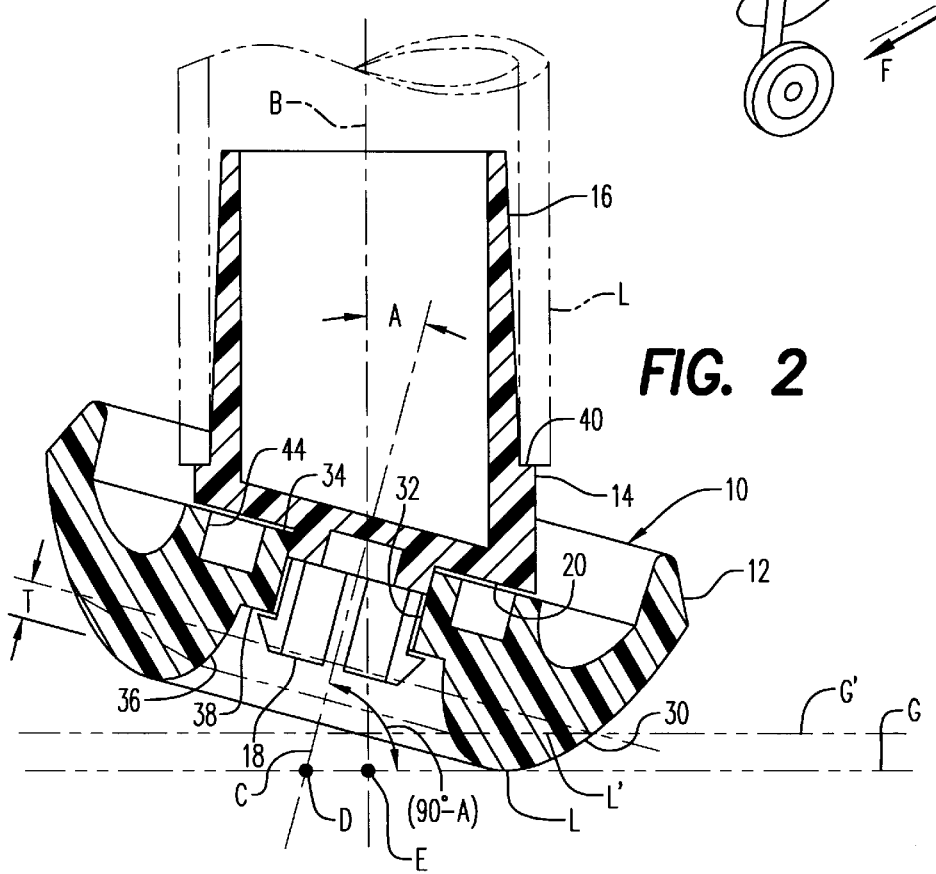
FIG. 2 is a longitudinal section view of the device 10 in FIG. 1.
Figure 4:
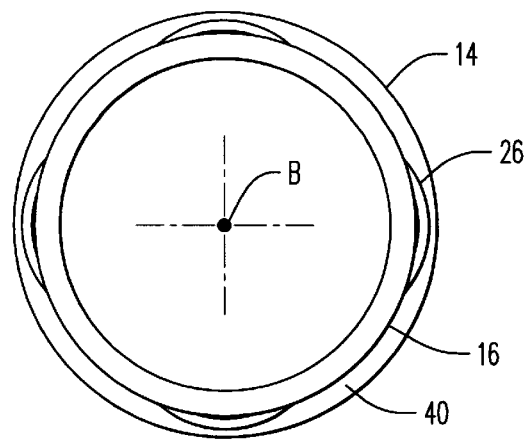
FIG. 4 is a top plan view of FIG. 3.
Figure 3:
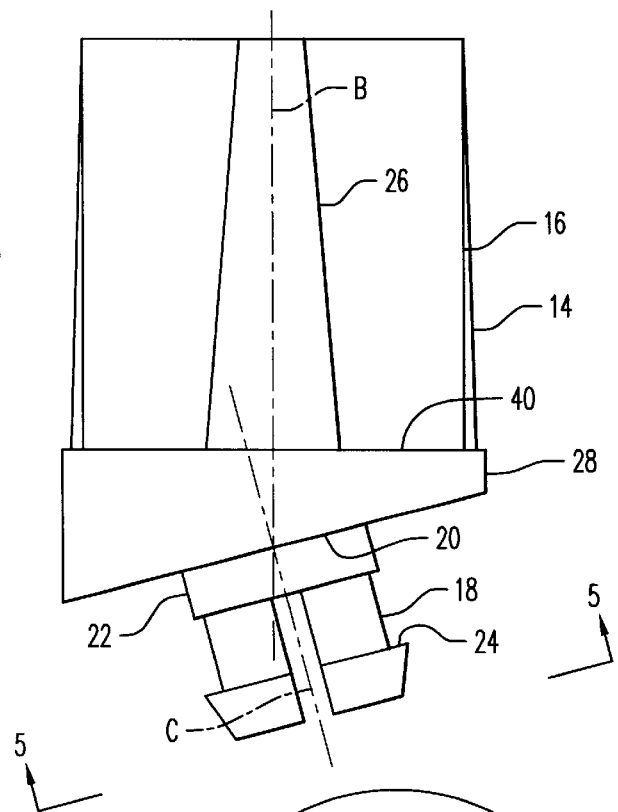
FIG. 3 is a side elevation view of the stationary member 14 of the invention 10 in FIG. 1.
Figure 5:
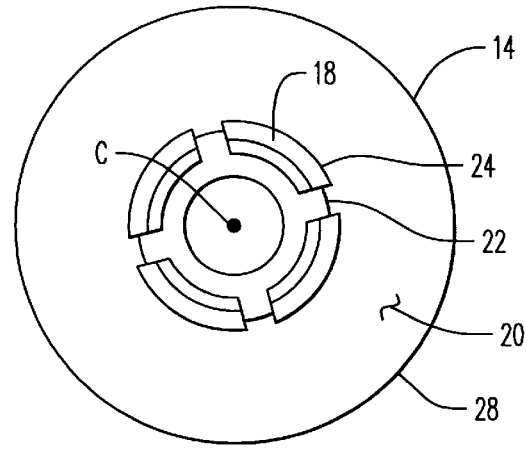
FIG. 5 is a view in the direction of arrows 5—5 in FIG. 3.

Referring now to the drawings, the invention is shown generally at numeral 10 in FIGS. 1 and 2 and includes a rotatable ground-engaging member 12 (shown in detail in FIG. 2) and a stationary member 14 (shown in detail in FIGS. 3–5). Each of these members 12 and 14 are molded of high-density polypropylene having calcium carbonate as a filler material.

The stationary member 14 includes a main tubular portion 16 which is sized in outside circumference to be snugly fitted into a lower end of a leg L of a conventional walker W as best seen in FIGS. 1 and 2. The stationary member 14 includes a shoulder 40 for controlling depth of engagement and also includes a plurality of tapered ribs 26 as seen in FIGS. 3 and 4 which provide a self-locking feature as the tubular portion 16 is forcibly urged into the lower leg L.

The stationary member 14 also includes an integrally molded support shaft 18 which, as best seen in FIGS. 2, 3 and 5, includes a plurality of symmetric, spaced cantilevered members 24 which lockingly engage into a central cylindrical mounting hole 32 mold formed into the ground-engaging member 12 described more fully herebelow. The support shaft 18 is generally circular and symmetric about an axis of rotation C which is oriented at an acute angle A and coplanar to, or intersecting a longitudinal or central axis B of the main tubular portion 16 as best seen in FIG. 2. Angle A is preferably in the range of about fifteen degrees (15°) but may vary considerably from that value, depending upon the characteristics of wear, maneuverability and lateral stability desired.

The ground-engaging member 12 is also mold formed of the above-named material having the previously described central mounting hole 32 which rotatably engages onto the support shaft 18 and against bearing surfaces 20 by surface 34 for weight bearing and cylindrical surface 22 by central hole 32 for rotational movement and support.

A ground-engaging surface 30 of the ground-engaging member 12 is convex and arcuately contoured somewhat in the shape of a portion of a parabola. When viewed another way, the entire cross sectional configuration of the rotatable ground-engaging member 12 as seen in FIG. 2 is somewhat similar to the laterally elongated letter W oriented at the acute angle A to the support substrate G. When this ground engaging member 12 and its contoured ground engaging surface 30 are oriented at the acute angle A with respect to the support substrate G such as the ground, a floor, a rug, concrete and the like, the point of contact L is established therebetween at a point or area of contact which is laterally displaced from an imaginary point D of intersection between the axis of rotation C and the support substrate G and also laterally from point E which is the imaginary intersection between the central axis B and the support substrate G.

By this arrangement as seen in FIG. 1, resistance to forwardly movement of the walker W in the direction of arrow F is substantially reduced by the rolling or rotational movement of the ground-engaging member 12 about the axis of rotation C. At the same time, the resistance to lateral movement in the direction of arrow S or sideways with respect to the walker W is increased as the glide 10 moves along a line of contact L due in part to the lateral offset of the line of contact L with respect to the central axis C. By insuring that the installation of the glide 10 is oriented rotationally so as to position the line of contact L laterally furthest from the central axis C, or so that the axis of rotation lies in a plane which is substantially transverse to the walker W, these operational features are maximized. Of the two such orientations 180° apart, having the line of contact L positioned inwardly between the rear legs L is preferred as shown.

Note in FIG. 2 that the cross sectional structure of the ground-engaging member 30 is lightened and maximized in general uniform cross-sectional thickness by the addition of mold cavity 44. Note also that, although the invention 10 is preferably shown being completely self-retaining within the tubular lower leg L and self-connecting between the two molded members 12 and 14, other embodiments wherein mechanical fasteners are utilized are envisioned within the scope of this invention. Further, as wear of the ground engaging member 12 occurs, the original point of contact moves to G' and broadens to become an area or line of contact L'. Nonetheless, even after this amount of wear, the above-described benefits are substantially intact. Moreover, because the ground-engaging member 12 rotates about axis C, wear occurs through a full 360° of the ground-engaging line of contact L', so that a thickness, for example, T, uniformly wears fully about axis C. By this arrangement, substantially more of the material utilized to mold form the ground-engaging member 12 is available for extended wear.

Figure 6:
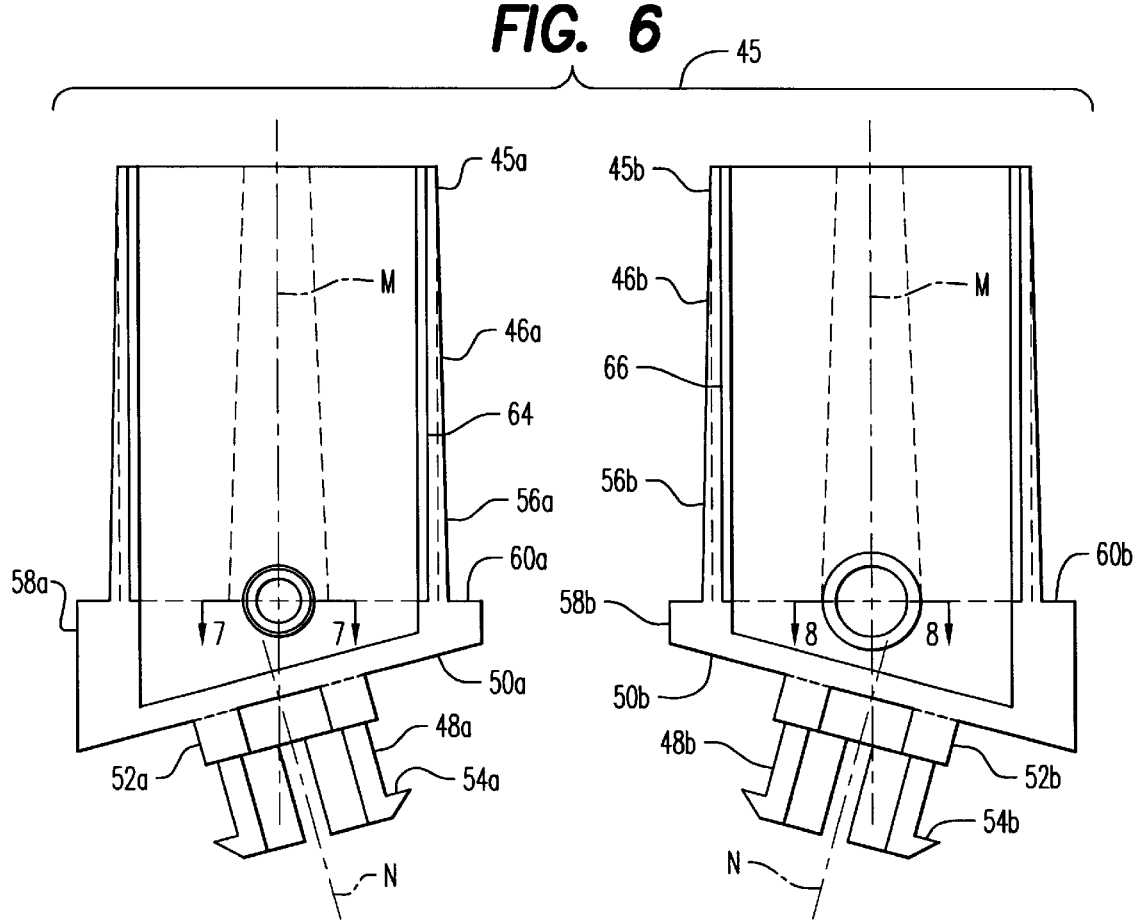
FIG. 6 is a side elevation view of each mating half of the preferred embodiment of the stationary member 45.
Figure 7:
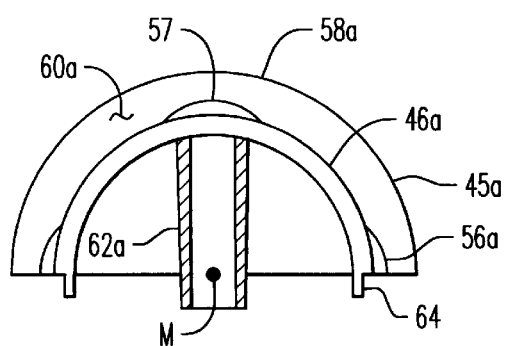
FIG. 7 is a top plan view partially broken in the direction of arrows 7—7 in FIG. 6 of one half 45a of the stationary member 45.
Figure 8:
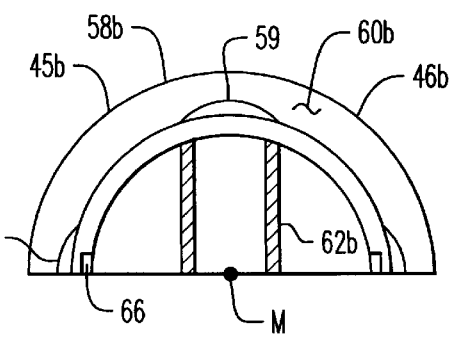
FIG. 8 is a top plan view partially broken view in the direction of arrows 8—8 in FIG. 6 of one half 45b of the stationary member 45.

Referring now to FIGS. 6, 7 and 8, the preferred embodiment of the stationary member is shown at 45 in FIG. 6 and includes two mating molded member halves 45a and 45b which are again molded of high-density polypropylene having calcium carbonate as a filler material. The stationary member halves 45a and 45b include tubular portions 46a and 46b which, when fitted together, define an outside circumference which will snugly fit into the lower end of the leg L of the walker W. The stationary member 45 includes a mating shoulder portion 60a and 60b for controlling depth of engagement and also includes a plurality of tapered longitudinal exterior ribs 56a/56b, 57 and 59 which provide a self-locking feature as the two part connected tubular portions 46a and 46b are forcibly urged into the lower leg L as previously described.

The stationary member 45 also includes an integrally molded support shaft 48a/48b, with cantilever members 54a/54b which lockably engage into the cylindrical mounting hole 32 mold formed as previously described into the ground-engaging member 12. Angular orientation between axes M and N is at an acute angle as previously described in the range of preferably about 15°. The remainder of the features 50a/50b, 52a/54b function as do the corresponding previously described features with respect to FIG. 2.

This embodiment 45 is provided for ease in mold manufacturing and includes mating tabs 64 which engage into slots 66 and mating tubular connectors 62a and 62b which are sized and tapered for self-locking engagement when the two halves 45a and 45b are assembled and forcibly urged together.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A glide for a lower end of a rear upright leg of a walker comprising:

a stationary member including a main upper portion thereof and a support shaft defining a lower portion of said stationary member, said upper portion having a central axis and a transverse size for stationary engagement with respect to the lower end of the leg, said support shaft having an axis of rotation which is substantially coplanar with said central axis and oriented at an acute angle thereto, said main upper portion having a configuration for non-rotatable connection to the lower end of the leg of the walker;

a ground engaging member held for rotation only about said axis of rotation on said support shaft and having a contoured lower ground engaging surface which contacts a support substrate atop which the walker is positioned at a point or area of contact which is laterally offset from said central axis.

2. A glide as set forth in claim 1, wherein:

said acute angle is about fifteen degrees (15°).

3. A glide as set forth in claim 2, wherein:

said ground engaging surface is adapted in contour, when said stationary member is oriented in the leg to position said axis of rotation transversely with respect to the walker, to provide a resistance to lateral movement of the walker.

4. A glide connectable to a lower end of an upright leg of a walker comprising:

stationary member including an elongated upper portion having an upright central axis thereof and a lower support shaft having an axis of rotation, said upper portion having a configuration for non-rotatable connection to the lower end of the leg of the walker;

said central axis and said axis of rotation oriented at an acute angle one to another;

a ground engaging member held for rotation only on said support shaft, said ground engaging member having a hollow central portion and an arcuate ground engaging surface which contacts a support substrate laterally from said axis of rotation and said central axis.

5. A glide as set forth in claim 4, wherein:

said acute angle is about fifteen degrees (15°).

6. A glide as set forth in claim 5, wherein:

said ground engaging surface is adapted in contour, when said stationary member is oriented in the leg to position said axis of rotation transversely with respect to the walker, to provide a resistance to lateral movement of the walker.

7. A glide for a lower end of a leg of a walker comprising:

a stationary member formed as a single unit including an elongated upper tubular portion adapted to be held stationary at the lower end of the leg and a lower support shaft orientated at an acute angle with respect to said tubular portion, a central axis of said upper portion and an axis of rotation of said support shaft being substantially coplanar, said tubular portion having a configuration for non-rotatable connection to the lower end of the leg of the walker;

a ground engaging member held for substantially free rotation on said support shaft about said rotational axis and having a generally elongated W-shaped uniform cross section which defines a lower ground engaging surface which contacts a support substrate atop which the walker is positioned only at a point or area of contact laterally displaced from said central axis, a central portion of said ground engaging member being substantially hollow.

8. A glide as set forth in claim 7, wherein:

said acute angle is about fifteen degrees (15°).

9. A glide as set forth in claim 8, wherein:

said ground engaging surface is adapted in contour, when said stationary member is oriented in the leg to position said axis of rotation transversely with respect to the walker to provide a resistance to lateral movement of the walker.

10. A glide as set forth in claim 8, wherein:

said ground engaging member is substantially uniformly wearing through each 360° of rotation of said ground engaging member.

* * * * *